United States Patent [19]

Beckerle et al.

[11] Patent Number: 5,225,478
[45] Date of Patent: Jul. 6, 1993

[54] POLYMER POWDERS WHICH ARE REDISPERSIBLE IN WATER AND CAN BE PREPARED BY ATOMIZING AQUEOUS POLYMER DISPERSIONS, AND THEIR USE AS ADDITIVES IN HYDRAULIC BINDERS

[75] Inventors: Wilhelm F. Beckerle, Bobenheim-Roxheim; Rolf Dersch, Frankenthal; Gernot Franzmann, Bobenheim; Brigitte Gareiss, Ludwigshafen; Ludger Leber, Dannstadt-Schauernheim, all of Fed. Rep. of Germany

[73] Assignee: BASF Aktiengesellschaft, Ludwigshafen, Fed. Rep. of Germany

[21] Appl. No.: 879,734

[22] Filed: May 6, 1992

Related U.S. Application Data

[63] Continuation of Ser. No. 552,120, Jul. 13, 1990, abandoned.

[30] Foreign Application Priority Data

Jul. 14, 1989 [DE] Fed. Rep. of Germany ....... 3923229

[51] Int. Cl.$^5$ .......................... C08G 8/04; C08F 8/00; C08J 61/00
[52] U.S. Cl. .................................. 524/510; 524/595; 525/136; 528/129; 528/150
[58] Field of Search ............... 524/510, 595; 525/136; 528/129, 150

[56] References Cited

U.S. PATENT DOCUMENTS 3,219,607 11/1965 Perronin ............................ 524/510
4,816,558 3/1989 Rauch et al. ...................... 528/501

FOREIGN PATENT DOCUMENTS 2049114 8/1973 Fed. Rep. of Germany.
2238903 2/1974 Fed. Rep. of Germany.
2445813 9/1974 Fed. Rep. of Germany.
0078449 1/1989 Fed. Rep. of Germany.
523222 1/1940 United Kingdom.

Primary Examiner—John Kight, III
Assistant Examiner—T. Mosley
Attorney, Agent, or Firm—Oblon, Spivak, McClelland, Maier & Neustadt

[57] ABSTRACT

Polymer powders which are redispersible in water and are obtainable by atomizing aqueous polymer dispersions to which from 3 to 50% by weight, based on the polymer, of a water-soluble alkali metal salt or alkaline earth metal salt of a phenolsulfonic acid/formaldehyde condensate has been added are used as additives in hydraulic binders.

11 Claims, No Drawings

POLYMER POWDERS WHICH ARE REDISPERSIBLE IN WATER AND CAN BE PREPARED BY ATOMIZING AQUEOUS POLYMER DISPERSIONS, AND THEIR USE AS ADDITIVES IN HYDRAULIC BINDERS

This application is a continuation of application Ser. No. 07/552,120, filed On Jul. 13, 1990, now abandoned.

The present invention relates to polymer powders which are redispersible in water and are obtainable by atomizing aqueous polymer dispersions to which from 3 to 50% by weight, based on the polymer, of a water-soluble alkali metal salt or alkaline earth metal salt of a phenolsulfonic acid/formaldehyde condensate has been added, and their use as additives in hydraulic binders.

It is known that redispersible dispersion powders can be prepared by atomizing aqueous polymer dispersions in a stream of hot air. In the case of dispersions whose polymers have glass transition temperatures below about 50° C., it is necessary to add assistants to prevent the polymer particles from forming a film in the drier with formation of wall deposits and lumps, and to achieve adequate blocking resistance of the powders.

In addition to water-insoluble inert additives, such as finely divided silica, other possible additives are dispersions of polymers having a high styrene content (DE-A 2 238 903) or aqueous copolymer solutions based on vinylpyrrolidone and vinyl acetate (DE-A 3 143 071) and water-soluble sulfonate-containing condensates of melamine and formaldehyde (DE-A 2 049 114).

For the preparation of polymer powders which are redispersible in water and have particularly high blocking resistance, DE-A 3 143 070 recommends the addition of a water-soluble naphthalenesulfonic acid/formaldehyde con-densate in the form of the alkali metal salt or alkaline earth metal salt. In this process, free-flowing powders which are readily redispersible in water can be obtained, even from contact adhesive copolymer dispersions. Such redispersible polymer powders are suitable, for example, as additives in hydraulic binders which have a viscosity-reducing effect and impart elastic properties to the set mortar.

The advantages of the concrete or mortar which are achievable by this process are, however, offset by the fact that the flow is restricted, which is disadvantageous, for example in self-leveling filling compounds.

It is an object of the present invention to provide redispersible polymer powders which guarantee good flow when used as additives in hydraulic binders.

We have found that this object is achieved by the polymer powders mentioned at the outset and their use as additives in hydraulic binders.

Preferred embodiments of the invention are described in the subclaims.

The polymer dispersions for the preparation of redispersible polymer powders can be obtained in a conventional manner by emulsion polymerization of olefinically unsaturated monomers in the presence of the usual polymerization initiators, emulsifiers and dispersants at elevated temperatures, for example up to about 95° C. The mean particle size can be adjusted by conventional measures, for example via the type and amount of the emulsifiers: for the preparation of coarse-particled polymer dispersions, a small amount of emulsifier and non-ionic or highly ethoxylated ionic emulsifiers are generally advantageous. Protective colloids, for example polyvinyl alcohol, frequently have an advantageous effect. Polymerization in the presence of a seed latex can also be advantageous, particularly if the formation of new particles is suppressed. Finally, coarse-particled dispersions can also be produced by controlled agglomeration of finely divided latices.

Preferred polymer dispersions have a mean particle diameter (weight average) of from 400 to 5,000 nm, in particular from 650 to 5,000 nm. The measurement of the mean particle sizes of polymer dispersions, for example with the aid of an ultracentrifuge, is familiar to the skilled worker. The LT value, i.e. the light transmittance of the aqueous dispersion diluted to 0.01% by weight, a standard parameter which is readily obtainable experimentally, can also be used as a measure of the mean particle size of a polymer dispersion of similar monomer composition.

In the preparation of the polymer powders, the polymer content of the dispersion may vary from 30 to 65, in particular from 45 to 60, % by weight. The polymers generally have glass transition temperatures of from +50° to −60° C., polymers having a glass transition temperature of less than +25° C. preferably being used. Examples of olefinically unsaturated monomers from which the polymers may be derived are vinylaromatic monomers, such as styrene, monoolefinically unsaturated carboxylates of, in general, 4 to 14 carbon atoms, in particular acrylates and methacrylates of alkanols of 1 to 8 carbon atoms, and vinyl esters, in particular of acetic and propionic acid, as well as vinyl laurate and vinyl esters of versatic acids. Other suitable polymers are those which are derived from vinyl chloride and/or vinylidene chloride or from diolefins, in particular butadiene. In addition, the polymers may contain, as polymerized units, acrylonitrile and/or mono- and/or dicarboxylic acids of, in general, 3 to 5 carbon atoms and/or their amides which may be substituted at the nitrogen atom, in particular acrylic acid, methacrylic acid, itaconic acid, acrylamide, methacrylamide, N-methylolacrylamide and -methacrylamide and N-methoxymethylacrylamide and -methacrylamide. The amount of such monomers can be varied within wide ranges. It is from 0 to 40, frequently from 10 to 30, % by weight in the case of acrylonitrile, and frequently from 0.5 to 5, in particular from 1 to 4, % by weight in the case of monoolefinically unsaturated monomers having polar groups, such as acrylic acid or N-methylolmethacrylamide. The polymers may also contain, as polymerized units, small amounts of olefinically unsaturated esters of alkanediols, such as ethylene glycol monoacrylate and diacrylate and the corresponding methacrylates and butane-1,4-diol monoacrylate and diacrylate and the corresponding methacrylates. Finally, polymer dispersions which contain, as polymerized units, ethylene and vinyl acetate in a molar ratio of, in general, from 15:85 to 85:15 are also suitable.

Preferably used copolymers are those of acrylates and methacrylates of alkenols of 1 to 8 carbon atoms, which may contain, as polymerized units, not more than 65, in particular from 15 to 60, % by weight of styrene or a mixture of styrene and not more than 40% by weight, based on the styrene/acrylonitrile mixture, of acrylonitrile. For such acrylate/styrenecopolymer dispersions the LT value is in general less than 20%, frequently less than 10%.

In the preparation of the polymer powders, water-soluble alkali metal and/or alkaline earth metal salts of phenolsulfonic acid/formaldehyde condensates are added to the polymer dispersions prior to atomization, in an amount of from 3 to 50, preferably from 3 to 15, in particular from 5 to 10, % by weight, based on the polymer content of the aqueous polymer dispersions. The condensates contain in general 1 or 2 formaldehyde radicals, in particular 1 formaldehyde radical, per phenol radical and in particular 1 sulfo group per molecule. They are preferably used in the form of the Na salts. The alkaline earth metal salts and in particular the Ca salts are particularly preferred since they give a nonhygroscopic powder. Such salts of phenolsulfonic acid/formaldehyde condensates are commercially available.

In addition to the condensates, water-insoluble finely divided solids, for example finely divided silica or water-soluble protective colloids, for example polyvinyl alcohols or vinylpyrrolidone (co)polymers, may also have been added to the polymer dispersions in the preparation of the polymer powders.

Atomization of the aqueous polymer dispersions which contain the salts of the phenolsulfonic acid/formaldehyde condensates can be carried out in a conventional manner, in particular using one-material or multi-material nozzles or atomizer disks. The dispersions are generally atomized in a warm air stream, in which the water evaporates. Atomization can be carried out under atmospheric or reduced pressure. In general, the temperature of the warm air stream used for spray drying is from 100° to 200° C., in particular from 120° to 170° C. The dry redispersible polymer powders can be separated off in a conventional manner, in particular using cyclones or filter separators.

Polymer powders having high blocking resistance are obtained in a high yield even using comparatively small amounts of phenolsulfonic acid/formaldehyde condensates and can be readily stored at room temperature, without caking. The polymer powders are readily redispersible in water. After stirring in water, they can be cast into films which are similar in their tensile strength and elongation at break to films obtained from the primary dispersions.

When used for modifying hydraulic binders, the polymer powders are mixed with, for example, cement, from 5 to 30% by weight, based on cement, of polymer powder preferably being used, and further processing by mixing with water and if necessary mineral additives gives mortars having good flow and high flexibility.

Furthermore, the flexural strength and adhesive strength of such mortars are generally higher than in the case of plastic-free comparative samples. In addition to the mechanical properties, processing is also advantageously effected by the novel polymer powders: the polymer powders impart to the mortar a more fluid consistency, which changes only slightly during processing. Because they also harden rapidly, the polymer powders are therefore particularly suitable for flow mortars, for example self-leveling flooring plasters or filling compounds.

In the Examples which follow, parts and percentages are by weight. The mean particle size (weight average) of the polymer dispersions was determined with the aid of an analytical ultracentrifuge. The glass transition temperatures of the polymers were determined by the method of differential thermal analysis. Preparation of the polymer powder The amount, stated in Table 2, of the calcium salt of a phenolsulfonic acid/formaldehyde condensate or of the calcium salt of a naphthalenesulfonic acid/formaldehyde condensate was added to the aqueous dispersions of the polymers stated in Table 1 below. The mixture was atomized via a two-material nozzle of an IWK drier at 25° C. at a rate of 80 kg/hour. Precipitated hydrophobic silica was metered in an amount of 3% by weight, based on the dispersion, by means of a screw and via a further nozzle. The IWK drier was simultaneously fed with 2300 m³ (S.T.P.)/hour of warm air at 120° C., and the product obtained was separated off in a cyclone.

The compositions and characteristics of the polymer dispersions used are listed in Table 1.

TABLE 1

| Dispersion | Polymer composition | Polymer content % | Glass transition Temp. °C. | LT value % | Mean particle weight average nm |
|---|---|---|---|---|---|
| A | 46 parts of styrene 54 parts of butyl acrylate 0.8 part of acrylamide 0.8 part of methacrylamide | 50 | 16 | 7 | 832 |
| B | 29 parts of styrene 69 parts of butyl acrylate 2 parts of acrylamide | 55 | −7 | 36 | 234 |

The polymer powders obtained using the various amounts, stated in Table 2, of the phenolsulfonic acid/formaldehyde condensate showed little or no tendency to block (testing of blocking resistance under a pressure of 0.785 N/cm² at 23° C. for 24 hours) and could if necessary readily be milled and easily redispersed in water. Properties of mortar modified with the polymer powders The solidification time was characterized using mortars having a plastic/cement ratio of 0.1, on the basis of the Vicat solidification time (DIN 1164, Part 5).

The flow was determined using a mortar of the following composition:

137.0 g of cement PZ 55.
71.4 g of quartz powder W 4.
141.6 g of quartz sand 0.15–0.6.
13.7 g of polymer powder.
75.35 g of water.

Some of the mortar was placed in a ring of 7 cm diameter and 4 cm height, and the ring was pulled upward. The diameter of the spread-out mortar cake in cm indicates the flow of the mortar.

The values obtained in the measurements using the novel polymer powders are listed in Table 2. For comparison, the flow of the mortar without the addition of polymer powder (Example N) or with only 1.37 g of the calcium salt of the phenolsulfonic acid/formaldehyde condensate (Example NI) is also mentioned.

TABLE 2

| Example | Dispersion | Glass transition temp. °C. | Mean particle size DW | Calcium salt of phenolsulfonic acid/formaldehyde condensate, % by wt., based on polymer | | Vicat solidification time | Flow cm |
|---|---|---|---|---|---|---|---|
| 1 | A | 16 | 832 | 10 | (= 1.37 g) | 6 h 16 min | 26.7 |
| 2 | A | | | 7.5 | (= 1.03 g) | 6 h 40 min | 17.5 |
| 3 | A | | | 5 | (= 0.69 g) | 7 h 30 min | 13.1 |
| 4 | B | −7 | 234 | 20 | (= 2.74 g) | 14 h 50 min | 27.0 |
| | B | | | 10 | (= 1.37 g) | 14 h 05 min | 17.8 |
| Mortar without dispersion powder | | | | | | | |
| N | — | — | — | | — | 3 h | 8.0 |
| NI | — | — | — | | (1.37 g) | 0 h 30 min | 16.8 |

For comparison, Table 3 states the corresponding values obtained when the calcium salt of the naphthalenesulfonic acid/formaldehyde condensate is used instead of the calcium salt of the phenolsulfonic acid/formaldehyde condensate.

For Example NII, 1.37 g of this product were accordingly used instead of the polymer powder.

TABLE 3

| Comp. Examples | Dispersion | Glass transition temp. °C. | Mean particle size DW | Calcium salt of naphthalenesulfonic acid/formaldehyde condensate, % by wt., based on polymer | | Vicat solidification time | Flow cm |
|---|---|---|---|---|---|---|---|
| V 1 | A | 16 | 832 | 10 | (= 1.37 g) | 9 h 40 min | 19.1 |
| V 2 | A | | | 7.5 | (= 1.03 g) | 8 h 40 min | 11.8 |
| V 8 | B | −7 | 234 | 30 | (= 4.11 g) | 16 h 37 min | 14.3 |
| V 10 | B | | | 20 | (= 2.74 g) | 11 h 50 min | 11.0 |
| N | — | — | — | | — | 3 h | 8.0 |
| NII | — | — | — | | (1.37 g) | 4 h | 20.1 |

We claim:

1. A polymer powder which is redispersible in water, said polymer powder being obtained by atomizing an aqueous polymer dispersion of: a polymer of olefinically unsaturated monomers having a glass transition temperature of from +50° C. to −60° C.; and
   from 3 to 50% by weight, based on the polymer, of a water-soluble alkali metal salt or alkaline earth metal salt of a phenolsulfonic acid/formaldehyde condensate.

2. A polymer powder as claimed in claim 1, wherein the polymer particles of the aqueous polymer dispersion have a weight average particle size of from 400 to 5,000 nm.

3. A polymer powder as claimed in claim 1, wherein said polymer dispersion contains from 3 to 15% by weight of said salt.

4. A polymer powder as claimed in claim 1, wherein the salt is an alkaline earth metal salt.

5. A polymer powder as claimed in claim 1, wherein said olefinically unsaturated monomers are selected from the group consisting of vinyl aromatic monomers, monoolefinically unsaturated carboxylates of 4 to 14 carbon atoms, vinyl chloride, vinylidene chloride, diolefins, acrylonitrile, acrylic acid, methacrylic acid, itaconic acid, acrylamide, methacrylamide, N-methylolacrylamide, N-methylolmethacrylamide, N-methyoxymethylacrylamide, N-methoxymethylmethacrylamide, olefinically unsaturated esters of alkanediols and ethylene.

6. A polymer powder as claimed in claim 1, wherein said polymer comprises (meth)acrylate of an alkanol of 1 to 8 carbon atoms, and not more than 65% by weight of styrene or a mixture of styrene and not more than 40% by weight, based on the styrene/acrylonitrile mixture, of acrylonitrile.

7. A polymer powder as claimed in claim 1, wherein said polymer comprises ethylene and vinyl acetate in a molar ratio of from 15:85 to 85:15.

8. A method of modifying a hydraulic binder comprising cement, said method comprising:

mixing from 5 to 30% by weight, based on said cement, of a polymer powder which is redispersible in water with said cement,
wherein said polymer powder is obtained by atomizing an aqueous polymer dispersion of:
a polymer of olefinically unsaturated monomers having a glass transition temperature of from +50° C. to −60° C.; and
3 to 50% by weight, based on the polymer of a water-soluble alkali metal salt or alkaline earth metal salt of a phenolsulfonic acid/formaldenhyde condensate.

9. A method as claimed in claim 8, wherein said olefinically unsaturated monomers are selected from the group consisting of vinyl aromatic monomers, monolefinically unsaturated carboxylates of 4 to 14 carbon atoms, vinyl chloride, vinylidene chloride, diolefins, acrylonitrile, acrylic acid, methacrylic acid, itaconic acid, acrylamide, methacrylamide, N-methylolacrylamide, N-methylolmethacrylamide, N-methoxymethylacrylamide, N-methoxymethylmethacrylamide, olefinically unsaturated esters of alkanediols and ethylene.

10. A method as claimed in claim 8, wherein said polymer comprises (meth)acrylate of an alkanol of 1 to 8 carbon atoms, and not more than 65% by weight of styrene or a mixture of styrene and not more than 40% by weight, based on the styrene/acrylonitrile mixture, of acrylonitrile.

11. A method as claimed in claim 8, wherein said polymer comprises ethylene and vinyl acetate in a molar ratio of from 15:85 to 85:15.

* * * * *